(12) United States Patent
Recio et al.

(10) Patent No.: US 12,247,165 B2
(45) Date of Patent: Mar. 11, 2025

(54) ANTI-SYNERESIS AGENTS FOR FRACTURING OPERATIONS

(71) Applicant: Halliburton Energy Services, Inc., Houston, TX (US)

(72) Inventors: Antonio Recio, Houston, TX (US); Linping Ke, Houston, TX (US); William Cecil Pearl, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/233,215

(22) Filed: Aug. 11, 2023

(65) Prior Publication Data

US 2025/0051634 A1    Feb. 13, 2025

(51) Int. Cl.
*C09K 8/68* (2006.01)
*C09K 8/80* (2006.01)
*E21B 43/26* (2006.01)

(52) U.S. Cl.
CPC .............. *C09K 8/685* (2013.01); *C09K 8/80* (2013.01); *E21B 43/26* (2013.01)

(58) Field of Classification Search
CPC ...... C09K 8/512; C09K 8/68; C09K 2208/28; C09K 8/74; C09K 8/88; C09K 8/508; C09K 8/90; C09K 8/685; E21B 33/13; E21B 21/003; E21B 43/26
See application file for complete search history.

(56) References Cited

U.S. PATENT DOCUMENTS

| | | | |
|---|---|---|---|
| 4,137,182 A | * | 1/1979 | Golinkin ............... C09K 8/685 524/424 |
| 6,986,391 B2 | | 1/2006 | Funkhouser et al. |
| 9,688,908 B2 | | 6/2017 | Dugonjic-Bilic et al. |
| 10,961,438 B2 | | 3/2021 | Dugonjic-Bilic et al. |
| 2014/0069644 A1 | | 3/2014 | Reddy et al. |
| 2023/0055352 A1 | * | 2/2023 | Long ...................... C09K 8/514 |

* cited by examiner

*Primary Examiner* — Zakiya W Bates
(74) *Attorney, Agent, or Firm* — The Hilton Firm PLLC

(57) ABSTRACT

Fracturing fluids for treating subterranean formations. An example fracturing fluid includes an anti-syneresis agent, a water-soluble terpolymer, a terpolymer hydration aid, an antioxidizing agent, a metal crosslinking agent, a breaker, and an aqueous base fluid. The fracturing fluid is introduced into a wellbore penetrating the subterranean formation at a pressure sufficient to fracture the subterranean formation and the subterranean formation is fractured with the fracturing fluid.

20 Claims, 5 Drawing Sheets

ANTI-SYNERESIS AGENTS FOR FRACTURING OPERATIONS

TECHNICAL FIELD

The present disclosure relates generally to wellbore operations, and more particularly, to the use of an anti-syneresis agent to improve the thermal-thinning properties of fracturing fluids.

BACKGROUND

Hydrocarbon-bearing subterranean formations may be stimulated by hydraulic fracturing operations, wherein a fracturing fluid may be used to fracture the subterranean formation. A general fracturing operation may comprise pumping a fracturing fluid at a pressure above the fracture gradient of the subterranean formation. This pressurized fracturing fluid may then contact the subterranean formation to form a fracture therein. Some fracturing fluids utilize polymer gel systems. To be effective, the polymer gel systems should maintain a minimum viscosity during the fracturing operation. Operational conditions such as the wellbore temperature, pump rate of the fracturing fluid, and the total dissolved solids content of the base fluid may influence the stability of the polymer gel system. In some adverse conditions, these factors may reduce the viscosity of the fracturing fluid below acceptable operation levels. In particular, operations utilizing sea water, such as those that may occur on offshore rigs, may benefit from a polymer gel system that maintains its stability in a base fluid having a high dissolved solids content and used in a wellbore having a high temperature.

The stabilization of polymer gel systems in adverse conditions may allow for the stimulation of wellbores that would otherwise be difficult to produce as well as the use of less compatible base fluids, such as sea water, to provide a fracturing fluid with sufficient viscosity. The present invention provides improved compositions and methods for stabilizing polymer gel systems for the fracturing of subterranean formations.

BRIEF DESCRIPTION OF THE DRAWINGS

Illustrative examples of the present disclosure are described in detail below with reference to the attached drawing figures, which are incorporated by reference herein, and wherein.

Figure 1:
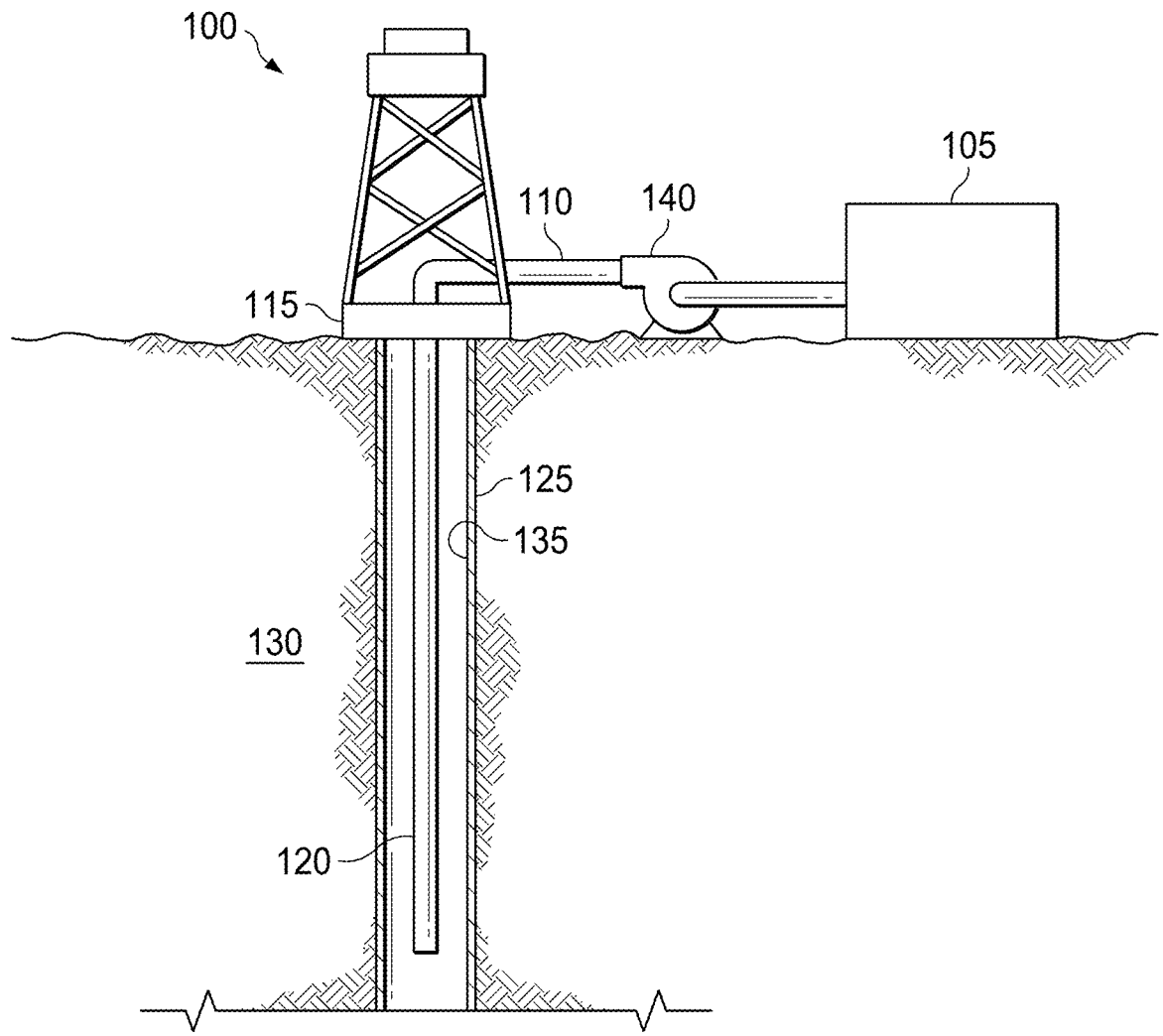
FIG. 1 is a schematic illustrating a system of surface equipment for the preparation and delivery of a fracturing fluid to a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of an anti-syneresis agent to improve the thermal-thinning properties of fracturing fluids.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to the use of an anti-syneresis agent to improve the thermal-thinning properties of fracturing fluids. Fracturing fluids may be used to form a fracture or fracture network in a subterranean formation. Advantageously, the fracturing fluids may maintain a desirable viscosity even under exposure to high shear, high temperatures, and with a base fluid of seawater (or other aqueous fluid) containing a high concentration of dissolved solids. The fracturing fluids comprise a crosslinked aqueous based fluid system and an anti-syneresis agent. The anti-syneresis agent may be used to stabilize the fracturing fluid in high-temperature conditions thereby mitigating thermal thinning of the fluid. In high temperature environments, a crosslinked fracturing fluid comprising a base fluid with a total dissolved solids content of greater than 15 k ppm (e.g., high salinity seawater) may begin to excrete water thereby resulting in a loss of viscosity and a thinning of the fluid, an effect referred to as syneresis. Syneresis may result in the fracturing fluid losing efficacy. Advantageously, it has been discovered that the anti-syneresis agents disclosed herein may be used to maintain viscosity of the fracturing fluid at an acceptable level even under high temperature conditions. Without being limited by theory, it is believed that the anti-syneresis agents hydrate in the excreted water and provide sufficient stability to the fluid to maintain the fluid viscosity at a sufficient level for a fracturing operation. As an additional advantage, the use of the anti-syneresis agent allows for the use of seawater or other aqueous fluids having a high dissolved solids content (e.g., greater than 15 k ppm). This is a particular advantage on offshore rigs, as the use of a seawater base fluid will preclude the need to store specially formulated stimulation fluids on the rig such as those containing a low dissolved solids content. Another advantage is that the fracturing fluid may be used in high temperature wellbores such as those having temperatures greater than 300° F. A further advantage is that the fracturing fluids may maintain their viscosity in high temperature wellbores, and pump rates associated with high shear rates, such as shear rates of 170 $s^{-1}$ or higher. In some examples, the shear rates may range from about 25 $s^{-1}$ to about 17,000 $s^{-1}$, and/or the pump rates may range from about 0.5 to about 330 barrels per minute (bbls/min). Additionally, the anti-syneresis agent may be added to the fracturing fluid on the fly without the need for additional or specialized mixing and pumping equipment.

The fracturing fluids described herein comprise an anti-syneresis agent. The anti-syneresis agent is a cross-linked copolymer comprising a thermally stable crosslinker and a thermally unstable crosslinker. The comonomers for the anti-syneresis agent include, but are not limited to, acrylamide, N-vinylpyrrolidone, 2-acrylamidobutanesulfonic acid ammonium salt, or any combination of monomers. The crosslinkers include, but are not limited to, N,N'-methylenebisacrylamide, tri(ethylglycol)divinyl ether, triallyl isocyanurate, pentaerythritol allyl ether, or any combination of crosslinkers. The anti-syneresis agent is a dispersed powder within the base gel of the fracturing fluid. Without limitation by theory, the anti-syneresis agent hydrates from the water excreted due to the syneresis of the terpolymer which may occur under high temperature conditions in a base fluid having a high concentration of dissolved solids. Hydration of the anti-syneresis agent is believed to stabilize the fracturing fluid, thereby reducing the loss of viscosity and allowing the fracturing fluid to continue to function over a wider range of wellbore environments. Without limitation by theory, the anti-syneresis agent utilizes a delayed viscosifying effect to facilitate easy mixing at the surface. The crosslinkers are added to improve the overall thermal stability of the copolymer and to produce the delay in hydration. The thermally unstable crosslinker is included to produce the delay in hydration and may cleave at a lower temperature than the thermally stable crosslinker. Once cleaved the copolymer can hydrate to produce the viscosifying effect.

The concentration of the anti-syneresis agent in a fracturing fluid may range from about 0.05% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the anti-syneresis agent in a fracturing fluid may range from about 0.05% (w/w) to about 20% (w/w), from about 0.1% (w/w) to about 20% (w/w), from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the anti-syneresis agent in the fracturing fluid may range from about 0.05% (w/w) to about 20% (w/w), from about 0.05% (w/w) to about 19% (w/w), from about 0.05% (w/w) to about 18% (w/w), from about 0.05% (w/w) to about 17% (w/w), from about 0.05% (w/w) to about 16% (w/w), from about 0.05% (w/w) to about 15% (w/w), from about 0.05% (w/w) to about 14% (w/w), from about 0.05% (w/w) to about 13% (w/w), from about 0.05% (w/w) to about 12% (w/w), from about 0.05% (w/w) to about 11% (w/w), from about 0.05% (w/w) to about 10% (w/w), from about 0.05% (w/w) to about 9% (w/w), from about 0.05% (w/w) to about 8% (w/w), from about 0.05% (w/w) to about 7% (w/w), from about 0.05% (w/w) to about 6% (w/w), from about 0.05% (w/w) to about 5% (w/w), from about 0.05% (w/w) to about 4% (w/w), from about 0.05% (w/w) to about 3% (w/w), from about 0.05% (w/w) to about 2% (w/w), from about 0.05% (w/w) to about 1% (w/w), from about 0.05% (w/w) to about 0.5% (w/w), or from about 0.05% (w/w) to about 0.1% (w/w). With the benefit of this disclosure, one of ordinary skill in the art will be readily able to prepare and select an anti-syneresis agent having a desirable concentration for a given application.

The anti-syneresis agent may be used to stabilize the viscosity of the fracturing fluid. The base gel is formed from a water-soluble terpolymer hydrated in the base aqueous fluid of the fracturing fluid. As used herein, "water-soluble terpolymer" refers to a terpolymer having a solubility of 1 gram in 1 liter of water at 25° C. Generally, the terpolymer is a temperature stable terpolymer crosslinked with polyvalent metal ions. The terpolymer is formed from a combination of monomers from the following groups: neutral acrylamide-based monomers, charged acrylamide-based monomers, diallyl-based monomers, vinyl-sulfonate based monomers, neutral acrylic acid-based monomers, charged acrylic-acid based monomers, and vinyl-phophonic acid-based monomers. Any combination of three different monomers from these groups may be used to form the water-soluble terpolymer. Specific examples of species from each grouping of monomers are provided below. In preferred examples, the terpolymer contains structural units where 0.005-20 wt. % are derived from an ethylene unsaturated phosphonic acid and its alkali metal salts and/or ammonium salts, 5-40 wt. % are derived from an ethylene unsaturated sulfonic acid as well as its alkali metal salts and/or ammonium salts, and 5-94.995 wt. % are derived from an amide of an ethylene unsaturated carboxylic acid selected from acrylamide, methacrylamide, C1-C4-alkyl derivatives, or any combination thereof. The percentage information relates to the total mass of the monomers used in the copolymerization. The polyvalent metal ions for the cross-linking of the polymers belong to the groups IIIA, IVB, VB, VIB, VIIB, and/or VIIIB of the periodic table. The content of the electrolyte in the fracturing fluid may be between about 0.075 and 25 wt. % relative to the total mass of the fracturing fluid.

Examples of neutral acrylamide-based monomers may include, but are not limited to, acrylamide; 2-propenamide; methacrylamide; N,N-dimethylacrylamide; N-isopropylacrylamide; 2,3,3-trichloroacrylamide; N,N'-methylenebisacrylamide; N,N-ethylenebis(acrylamide); piperazine diacrylamide; N-(isobutoxymethyl)acrylamide; N-hydroxyethyl acrylamide; N-hydroxymethyl acrylamide; N-(3-methoxypropyl)acrylamide); 3-(4-methylphenyl)acrylamide, N-(tert-butyl)acrylamide; N-[(diethylamino)methyl)]acrylamide; N-[(diethylamino)methyl)]acrylamide chloride; N-(1-pyrrolidinylmethyl)acrylamide; N-(1-pyrrolidinylmethyl)acrylamide hydrochloride; N-[2-(acryloylamino)phenyl]acrylamide, 3-Phenyl-N-(4-pyridinyl)acrylamide, N-allyl-3-(2-chlorophenyl)acrylamide; 2-methyl-N-naphthalen-1-yl-acrylamide; N-methoxy-n-methyl-3-phenyl-acrylamide; N-[2-(1H-indol-3-yl)ethyl]acrylamide; 3-(2-chlorophenyl)-n-(2-(4-morpholinyl)ethyl)acrylamide; N-3,5-dichloro-2-hydroxy-4-methyl-phenyl)-2-methyl acrylamide; 3-(4-chloro-phenyl)-n-(2-morpholin-4-yl-ethyl)-acrylamide; 3-(acrylamido)phenylboronic acid; 2-acrylamido-2-methyl-1-propanesulfonic acid; N-vinylsuccinimide; 1-ethenyl-1H-pyrrole-2,5-dione; N-vinylpyrrolidinone; N-vinylpiperidone; N-vinylcaprolactam; N-vinylheptalactam; 1-ethenyl-2-imidazolidinone; 1-ethenyl-1,3-dihydro-2H-imidazol-2-one; N,N-Bis(2-hydroxyethyl)-2-propenamide; N, N-Bis(2-hydroxyethyl)-2-methyl-2-propenamide; N-vinyl acetamide; N-vinyl formamide; N-vinyl-N-methyl formamide; N-vinyl-N-methyl acetamide; N-methylol-N-vinyl fonnamide; N-methylol-N-vinyl acetamide; or any combination of monomers.

Examples of charged acrylamide-based monomers may include, but are not limited to, N,N,N-Trimethyl-2-[(1-oxo-2-propen-1-yl)amino]ethanaminium chloride; N,N,N-Trimethyl-2-[(1-oxo-2-propen-1-yl)amino]ethanaminium sulfate; N,N,N-Trimethyl-2-[(1-oxo-2-propen-1-yl)amino]ethanaminium hydroxide; N,N,N-Trimethyl-2-[(1-oxo-2-propen-1-yl)amino]propanaminium chloride; N,N,N-Trimethyl-2-[(1-oxo-2-propen-1-yl)amino]propanaminium sulfate; N,N,N-Trimethyl-2-[(1-oxo-2-propen-1-yl)amino]propanaminium hydroxide; N,N,N-Trimethyl-2-[(1-oxo-2-propen-1-yl)amino]butanaminium chloride; N,N,N-Trimethyl-2-[(1-oxo-2-propen-1-yl)amino]butanaminium sulfate; N,N,N-Trimethyl-2-[(1-oxo-2-propen-1-yl)amino]butanaminium hydroxide; N,N,N-Trimethyl-2-[(1-oxo-2-propen-1-methyl)amino]ethanaminium chloride; N,N,N-Trimethyl-2-[(1-oxo-2-propen-1-methyl)amino]ethanaminium sulfate; N,N,N-Trimethyl-2-[(1-oxo-2-propen-1-methyl)amino]ethanaminium hydroxide; N,N,N-Trimethyl-2-[(1-oxo-2-propen-1-methyl)amino]propanaminium chloride; N,N,N-Trimethyl-2-[(1-oxo-2-propen-1-methyl)amino]propanaminium sulfate; N,N,N-Trimethyl-2-[(1-oxo-2-propen-1-methyl)amino]propanaminium hydroxide; N,N,N-Trimethyl-2-[(1-oxo-2-propen-1-methyl)amino]butanaminium chloride; N,N,N-Trimethyl-2-[(1-oxo-2-propen-1-methyl)amino]butanaminium sulfate; N,N,N-Trimethyl-2-[(1-oxo-2-propen-1-methyl)amino]butanaminium hydroxide; N,N,N-Trimethyl-4-[(1-oxo-2-propen-1-yl)amino]benzenemethanaminium; N,N,N-Trimethyl-4-[(1-oxo-2-propen-1-yl)amino]benzenemethanaminium chloride; N,N,N-Trimethyl-4-[(1-oxo-2-propen-1-yl)amino]benzenemethanaminium sulfate; N,N,N-Trimethyl-4-[(1-oxo-2-propen-1-yl)amino]benzenemethanaminium hydroxide; N,N,N-Trimethyl-4-[(2-methyl-1-oxo-2-propen-1-yl)amino]benzenemethanaminium; N,N,N-Trimethyl-4-[(2-methyl-1-oxo-2-propen-1-yl)amino]benzenemethanaminium chloride; N,N,N-Trimethyl-4-[(2-methyl-1-oxo-2-propen-1-yl)amino]benzenemethanaminium sulfate; N,N,N-Trimethyl-4-[(2-methyl-1-oxo-2-propen-1-yl)amino]benzenemethanaminium hydroxide, or any combination of monomers.

Examples of diallyl-based monomers include, but are not limited to, diallyl sulfide; 3-(2-propen-1-ylsulfonyl)-1-propene; diallyldimethylammonium; diallyldimethylammonium chloride; diallyldimethylammonium suflate; diallyldimethylammonium hydroxide; N,N-Bis(2-hydroxyethyl)-N-2-propen-1-yl-2-propen-1-aminium; N,N-Bis(2-hydroxyethyl)-N-2-propen-1-yl-2-propen-1-aminium chloride; N,N-Bis(2-hydroxyethyl)-N-2-propen-1-yl-2-propen-1-aminium sulfate, N,N-Bis(2-hydroxyethyl)-N-2-propen-1-yl-2-propen-1-aminium hydroxide, or any combination of monomers.

Examples of vinyl-sulfonate based monomers include, but are not limited to, 2-acrylamido-2-methyl-1-propanesulfonic acid sodium salt; vinylsulfonic acid; vinylsulfonic acid sodium salt; 4-vinylbenzenesulfonic acid; 4-vinylbenzenesulfonic acid sodium salt; 5-ethenyl-1,3-benzenedisulfonic acid; 5-ethenyl-1,3-benzenedisulfonic acid sodium salt; 5-ethenyl-2-hydroxy-1,3-benzenedisulfonic; 2-acrylamidoethanesulfonic acid; 2-acrylamidoethanesulfonic acid sodium salt; 2-acrylamidoethanesulfonic acid ammonium salt; 2-methyacylamidoethanesulfonic acid; 3-acrylamidopropanesulfonic acid; 2-acrylamidopropanesulfonic acid sodium salt; 2-acrylamidopropanesulfonic acid ammonium salt; 4-acrylamidobutanesulfonic acid; 2-acrylamidobutanesulfonic acid sodium salt; 2-acrylamidobutanesulfonic acid ammonium salt; or any combination of monomers.

Examples of neutral acrylic acid-based monomers may include, but are not limited to, acrylic acid (i.e., propenoic acid); acrylic acid mono-valent salt; acrylic acid di-valent salt; acrylic acid tri-valent salt; methyl acrylate; ethyl acrylate; n-propyl acrylate; isopropyl acrylate; n-butyl acrylate; sec-butyl acrylate; tert-butyl acrylate; 2-methyl-2-propionic acid (i.e., methyl methacrylate); ethyl methacrylate; n-propyl methacrylate; isopropyl methacrylate; n-butyl methacrylate; sec-butyl methacrylate; tert-butyl methacrylate; 2-hydroxyethyl acrylate; 2-hydroxyethyl methacrylate; 2-(-2-hydroxyethoxy)ethyl acrylate; 2-[2-(2-hydroxyethoxy)ethoxy]ethyl acrylate; ethoxylated acrylic acid; ethoxylated methacrylate, moles of ethylene oxide from 1 to 150; propoxylated acrylic acid; propoxylated methacrylate, moles of propylene oxide from 1 to 150; fumaric acid; maleic acid; itaconic acid; crotonic acid; or any combination of monomers.

Examples of charged acrylic acid-based monomers may include, but are not limited to, (2-acryloyloxyethyl)trimethyl ammonium chloride; (2-acryloyloxyethyl)trimethyl ammonium chloride sulfate; (2-acryloyloxyethyl)trimethyl ammonium hydroxide; N,N,N-trimethyl-3-[(1-oxo-2-propen-1-yl)oxy]-1-propanaminium chloride; N,N,N-trimethyl-3-[(1-oxo-2-propen-1-yl)oxy]-1-propanaminium sulfate; N,N,N-trimethyl-3-[(1-oxo-2-propen-1-yl)oxy]-1-propanaminium hydroxide; N,N,N-trimethyl-4-[(1-oxo-2-propen-1-yl)oxy]-1-butanaminium chloride; N,N,N-trimethyl-4-[(1-oxo-2-propen-1-yl)oxy]-1-butanaminium sulfate; N,N,N-trimethyl-4-[(1-oxo-2-propen-1-yl)oxy]-1-butanaminium hydroxide; (2-methacryloyloxyethyl)trimethyl ammonium chloride; (2-methacryloyloxyethyl)trimethyl ammonium chloride sulfate; (2-methacryloyloxyethyl)trimethyl ammonium hydroxide; N,N,N-trimethyl-3-[(1-oxo-2-propen-1-yl)oxy]-1-propanaminium chloride; N,N,N-trimethyl-3-[(1-oxo-2-propen-1-methyl)oxy]-1-propanaminium sulfate; N,N,N-trimethyl-3-[(1-oxo-2-propen-1-methyl)oxy]-1-propanaminium hydroxide; N,N,N-trimethyl-4-[(1-oxo-2-propen-1-methyl)oxy]-1-butanaminium chloride; N,N,N-trimethyl-4-[(1-oxo-2-propen-1-methyl)oxy]-1-butanaminium sulfate; N,N,N-trimethyl-4-[(1-oxo-2-propen-1-methyl)oxy]-1-butanaminium hydroxide; or any combination of monomers.

Examples of vinyl phosphonic acid-based monomers may include, but are not limited to, vinylphosphonic acid; vinylphosphonic acid mono-valent salt; vinylphosphonic acid di-valent salt; vinylphosphonic acid tri-valent salt; P-(4-ethenylphenyl)phosphonic acid; P-(4-ethenylphenyl)phosphonic acid mono-valent salt; P-(4-ethenylphenyl)phosphonic acid di-valent salt; P-(4-ethenylphenyl)phosphonic acid tri-valent salt; P-(2-ethenylphenyl)phosphonic acid; P-(2-ethenylphenyl)phosphonic acid mono-valent salt; P-(2-ethenylphenyl)phosphonic acid di-valent salt; P-(2-ethenylphenyl)phosphonic acid tri-valent salt; P-(3-ethenylphenyl)phosphonic acid; P-(3-ethenylphenyl)phosphonic acid mono-valent salt; P-(3-ethenylphenyl)phosphonic acid di-valent salt; P-(3-ethenylphenyl)phosphonic acid tri-valent salt; or any combination of monomers.

The concentration of the terpolymer in a fracturing fluid may range from about 0.1% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the terpolymer in a fracturing fluid may range from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the terpolymer in the fracturing fluid may range from about 0.5% (w/w) to about 20% (w/w), from about 0.5% (w/w) to about 19% (w/w), from about 0.5% (w/w) to about 18% (w/w), from about 0.5% (w/w) to about 17% (w/w), from about 0.5% (w/w) to about 16% (w/w), from about 0.5% (w/w) to about 15% (w/w), from about 0.5% (w/w) to about 14% (w/w), from about 0.5% (w/w) to about 13% (w/w), from about 0.5% (w/w) to about 12% (w/w), from about 0.5% (w/w) to about 11% (w/w), from about 0.5% (w/w) to about 10% (w/w), from about 0.5% (w/w) to about 9% (w/w), from about 0.5% (w/w) to about 8% (w/w), from about 0.5% (w/w) to about 7% (w/w), from about 0.5% (w/w) to about 6% (w/w), from about 0.5% (w/w) to about 5% (w/w), from about 0.5% (w/w) to about 4% (w/w), from about 0.5% (w/w) to about 3% (w/w), from about 0.5% (w/w) to about 2% (w/w), or from about 0.5% (w/w) to about 1% (w/w). With the benefit of this disclosure, one of ordinary skill in the art will be readily able to prepare and select a terpolymer having a desirable concentration for a given application.

Examples of the fracturing fluids comprise a terpolymer hydration aid to assist hydration of the terpolymer. Generally, the terpolymer hydration aids have a hydrophilic-lipophilic balance of about 11 to about 13. Examples of the hydration aid may include, but are not limited to, alkylphenol alkoxylate, alkyl polyglucosides, alkoxylated alkylamines, alkoxylated primary alcohols, alkoxylated branched alcohols, or any combination of hydration aids.

The concentration of the terpolymer hydration aid in a fracturing fluid may range from about 0.05% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the terpolymer hydration aid in a fracturing fluid may range from about 0.05% (w/w) to about 20% (w/w), from about 0.1% (w/w) to about 20% (w/w), from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the terpolymer hydration aid in the fracturing fluid may range from about 0.05% (w/w) to about 20% (w/w), from about 0.05% (w/w) to about 19% (w/w), from about 0.05% (w/w) to about 18% (w/w), from about 0.05% (w/w) to about 17% (w/w), from about 0.05% (w/w) to about 16% (w/w), from about 0.05% (w/w) to about 15% (w/w), from about 0.05% (w/w) to about 14% (w/w), from about 0.05% (w/w) to about 13% (w/w), from about 0.05% (w/w) to about 12% (w/w), from about 0.05% (w/w) to about 11% (w/w), from about 0.05% (w/w) to about 10% (w/w), from about 0.05% (w/w) to about 9% (w/w), from about 0.05% (w/w) to about 8% (w/w), from about 0.05% (w/w) to about 7% (w/w), from about 0.05% (w/w) to about 6% (w/w), from about 0.05% (w/w) to about 5% (w/w), from about 0.05% (w/w) to about 4% (w/w), from about 0.05% (w/w) to about 3% (w/w), from about 0.05% (w/w) to about 2% (w/w), from about 0.05% (w/w) to about 1% (w/w), from about 0.05% (w/w) to about 0.5% (w/w), or from about 0.05% (w/w) to about 0.1% (w/w). With the benefit of this disclosure, one of ordinary skill in the art will be readily able to prepare and select a terpolymer hydration aid having a desirable concentration for a given application.

Examples of the fracturing fluids comprise an antioxidizing agent to reduce oxidation of the other components of the fracturing fluid. Examples of the antioxidizing agent may include, but are not limited to, sodium thiosulfate, ascorbic acid, phenothiazine, alkyl-substituted phenothiazine, aryl-substituted phenothiazine, aroyl-substituted phenothiazine, carboxyl-substituted N-phenothiazine, halogen-substituted phenothiazine, (dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide, 3-phenylphenothiazine, N-phenylphenothiazine, 10,10'-diphenyl-phenothiazine, N-benzoylphenothiazine, 7-benzoylphenothiazine, 3,7-difluorophenothiazine, N-ethylphenothiazine, 2-acetyl-phenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-octadecylphenothiazine, N-propylphenothiazine, the hydrochlorides of any of these compounds, or any combination of antioxidizing agents.

The concentration of the antioxidizing agent in a fracturing fluid may range from about 0.5% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the antioxidizing agent in a fracturing fluid may range from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the antioxidizing agent in the fracturing fluid may range from about 0.5% (w/w) to about 20% (w/w), from about 0.5% (w/w) to about 19% (w/w), from about 0.5% (w/w) to about 18% (w/w), from about 0.5% (w/w) to about 17% (w/w), from about 0.5% (w/w) to about 16% (w/w), from about 0.5% (w/w) to about 15% (w/w), from about 0.5% (w/w) to about 14% (w/w), from about 0.5% (w/w) to about 13% (w/w), from about 0.5% (w/w) to about 12% (w/w), from about 0.5% (w/w) to about 11% (w/w), from about 0.5% (w/w) to about 10% (w/w), from about 0.5% (w/w) to about 9% (w/w), from about 0.5% (w/w) to about 8% (w/w), from about 0.5% (w/w) to about 7% (w/w), from about 0.5% (w/w) to about 6% (w/w), from about 0.5% (w/w) to about 5% (w/w), from about 0.5% (w/w) to about 4% (w/w), from about 0.5% (w/w) to about 3% (w/w), from about 0.5% (w/w) to about 2% (w/w), or from about 0.5% (w/w) to about 1% (w/w). With the benefit of this disclosure, one of ordinary skill in the art will be readily able to prepare and select an antioxidizing agent having a desirable concentration for a given application.

Examples of the fracturing fluids comprise a metal cross-linking agent to crosslink the water-soluble terpolymer. Generally, the terpolymer may be ionically crosslinked by multivalent metal ions or metal complexes selected from the groups IIA, IVB, VB, VIB, IIVB and/or VIIIB of the periodic table. Specific examples of the metal cross-linking agent may include, but are not limited to, ions and/or complexes of zirconium, aluminum, titanium, boron, chromium, iron, or any combination of metal cross-linking agents. In some examples, water-soluble salts of the multivalent metal ions may be used. Suitable anions may include, but are not limited to, halides such as chloride, sulfate, lactate, citrate or gluconate. In some examples, complexes of the multivalent metal ions with organic N- and O-compounds may be used. Examples may include, but are not limited to, alcohols, such as di- and triols; mono-, di- and tri-carboxylic acids; mono-, di- and triamines and/or hydroxyalkylamines; or any combinations thereof.

The concentration of the metal crosslinking agent in a fracturing fluid may range from about 0.005% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the metal crosslinking agent in a fracturing fluid may range from about 0.005% (w/w) to about 20% (w/w), from about 0.01% (w/w) to about 20% (w/w), from about 0.05% (w/w) to about 20% (w/w), from about 0.1% (w/w) to about 20% (w/w), from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the metal crosslinking agent in the fracturing fluid may range from about 0.005% (w/w) to about 20% (w/w), from about 0.005% (w/w) to about 19% (w/w), from about 0.005% (w/w) to about 18% (w/w), from about 0.005% (w/w) to about 17% (w/w), from about 0.005% (w/w) to about 16% (w/w), from about 0.005% (w/w) to about 15% (w/w), from about 0.005% (w/w) to about 14% (w/w), from about 0.005% (w/w) to about 13% (w/w), from about 0.005% (w/w) to about 12% (w/w), from about 0.005% (w/w) to about 11% (w/w), from about 0.005% (w/w) to about 10% (w/w), from about 0.005% (w/w) to about 9% (w/w), from about 0.005% (w/w) to about 8% (w/w), from about 0.005% (w/w) to about 7% (w/w), from about 0.005% (w/w) to about 6% (w/w), from about 0.005% (w/w) to about 5% (w/w), from about 0.005% (w/w) to about 4% (w/w), from about 0.005% (w/w) to about 3% (w/w), from about 0.005% (w/w) to about 2% (w/w), from about 0.005% (w/w) to about 1% (w/w), from about 0.005% (w/w) to about 0.5% (w/w), from about 0.005% (w/w) to about 0.1% (w/w), from about 0.005% (w/w) to about 0.05% (w/w), or from about 0.005% (w/w) to about 0.01% (w/w). With the benefit of this disclosure, one of ordinary skill in the art will be readily able to prepare and select a metal crosslinking agent having a desirable concentration for a given application.

Examples of the fracturing fluids comprise a breaker to reduce the viscosity of the fracturing fluid and/or degrade the terpolymer after the placement of the proppant. These breakers are configured to work on a delay to allow the fracturing fluid to transport, suspend, and place a proppant in the fracture. Once broken, the fracturing fluid remnants are able to flow back out of the fracture leaving the placed proppant behind. General examples of the breakers may include, but are not limited to, persulfates, perborates, percarbonates, peroxides, bromates, chlorites, N- and O-acyl compounds, dialkyperoxides, diacylperoxides, peroxydicarbonates, alkylhydroperoxides, esters of peracids, or combinations of breakers. Specific examples of breakers may include, but are not limited to, sodium chlorite, sodium chlorate, sodium bromate, sodium persulfate, ammonium persulfate, potassium persulfate, sodium carbonate, sodium perborate, sodium percarbonate, t-amyl-2-ethyl hexyl percarbonate, t-butyl-2-ethyl hexyl percarbonate. diisopropyl peroxydicarbonate, di-sec-butyl peroxydicarbonate, di-t-butyl peroxydicarbonate, di-n-butyl peroxydicarbonate, di(2-ethylhexyl)peroxyperdicarbonate, di(4-t-butyl)cyclohexyl peroxydicarbonate, dicetyl peroxydicarbonate, diisobutyryl peroxide, dilauroyl peroxide, didecanoyl peroxide, dibenzoyl peroxide, di-t-butylperoxide, dicumylperoxide, cumyl-t-butyl peroxide, 2,5-di methy-2,5-di(t-butylperoxy)hexane, 1,1-di(t-butylperoxy)cyclohexane, 1,1-di(t-amylperoxy)cyclohexane, 1,1-di(t-butylperoxy)3,3,5-trimethylcyclohexane, cumyl hydoperoxide, i-propylcumyl hydroperoxide, t-butyl hydroperoxide, t-amyl hydroperoxide, 1,1,3,3-tetramethyl hydroperoxide, 2,5-dimethyl-2,5-di(2-ethylhexanoyl peroxy)hexane, dibenzoyl peroxide, dicumyl peroxide, t-butyl peroxyisbutyrate, t-butyl peroxy-2-ethylhexanoate, diisobutyryl peroxide, t-butyl peroxydiethylacetate, diisopropyl peroxydicarbonate, 2,5-dimethyl-2,5-di(2-ethylhexanoyl peroxy)hexane, 2,3-dimethyl-2,3-diphenylbutane, esters from peracetic acid, esters from perpivalic acid, esters from perbutanoic acid, esters from perdecanoic acid, esters from perheptanoic acid, esters from per(2-ethylhexanoic)acid, esters from perbenzoic acid with t-utanol, t-amyl alcohol, 2-ethyl hexanol, or any combination of breakers.

These breakers are oxidative and may release hydrogen peroxide which is a strong oxidizing agent. The terpolymer chain may be degraded by these oxidative processes. The following compounds may additionally be used with the breaker to enhance the oxidative activity of the formed peroxide: tetraacetyl ethylendiamine (TAED), nonanoyloxy benzenesulfonate (NOBS), dodecanoyl oxybenzenesulfonate (LOBS), decanoyl oxybenzoic acid (DOBA), or combinations of oxidative enhancers.

The concentration of the breaker in a fracturing fluid may range from about 0.001% w/w to about 20% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the breaker in a fracturing fluid may range from about 0.001% (w/w) to about 20% (w/w), 0.005% (w/w) to about 20% (w/w), from about 0.01% (w/w) to about 20% (w/w), 0.05% (w/w) to about 20% (w/w), from about 0.1% (w/w) to about 20% (w/w), from about 0.5% (w/w) to about 20% (w/w), from about 1% (w/w) to about 20% (w/w), from about 2% (w/w) to about 20% (w/w), from about 3% (w/w) to about 20% (w/w), from about 4% (w/w) to about 20% (w/w), from about 5% (w/w) to about 20% (w/w), from about 6% (w/w) to about 20% (w/w), from about 7% (w/w) to about 20% (w/w), from about 8% (w/w) to about 20% (w/w), from about 9% (w/w) to about 20% (w/w), from about 10% (w/w) to about 20% (w/w), from about 11% (w/w) to about 20% (w/w), from about 12% (w/w) to about 20% (w/w), from about 13% (w/w) to about 20% (w/w), from about 14% (w/w) to about 20% (w/w), from about 15% (w/w) to about 20% (w/w), from about 16% (w/w) to about 20% (w/w), from about 17% (w/w) to about 20% (w/w), from about 18% (w/w) to about 20% (w/w), or from about 19% (w/w) to about 20% (w/w). As another example, the concentration of the breaker in the fracturing fluid may range from about 0.001% (w/w) to about 20% (w/w), from about 0.001% (w/w) to about 19% (w/w), from about 0.001% (w/w) to about 18% (w/w), from about 0.001% (w/w) to about 17% (w/w), from about 0.001% (w/w) to about 16% (w/w), from about 0.001% (w/w) to about 15% (w/w), from about 0.001% (w/w) to about 14% (w/w), from about 0.001% (w/w) to about 13% (w/w), from about 0.001% (w/w) to about 12% (w/w), from about 0.001% (w/w) to about 11% (w/w), from about 0.001% (w/w) to about 10% (w/w), from about 0.001% (w/w) to about 9% (w/w), from about 0.001% (w/w) to about 8% (w/w), from about 0.001% (w/w) to about 7% (w/w), from about 0.001% (w/w) to about 6% (w/w), from about 0.001% (w/w) to about 5% (w/w), from about 0.001% (w/w) to about 4% (w/w), from about 0.001% (w/w) to about 3% (w/w), from about 0.001% (w/w) to about 2% (w/w), from about 0.001% (w/w) to about 1% (w/w), from about 0.001% (w/w) to about 0.5% (w/w), from about 0.001% (w/w) to about 0.1% (w/w), from about 0.001% (w/w) to about 0.05% (w/w), from about 0.001% (w/w) to about 0.01% (w/w), or from about 0.001% (w/w) to about 0.005% (w/w). With the benefit of this disclosure, one of ordinary skill in the art will be readily able to prepare and select a breaker having a desirable concentration for a given application.

The fracturing fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some preferred examples, the aqueous base fluid is seawater having a high concentration of dissolved solids. These dissolved solids may include ions that may be detrimental to performance in the absence of the anti-syneresis agent such as sulfate ions, calcium ions, magnesium ions, barium ions, bromide ions and the like. The total dissolved solids concentration may be greater than 15,000 ppm. In some examples, the total dissolved solids content of the base fluid may be in a range of about 15,000 ppm to about 500,000 ppm. One of ordinary skill in the art, with the benefit of this disclosure, should be readily able to select an aqueous base fluid for a chosen application.

The concentration of the aqueous base fluid in the fracturing fluid may range from about 1% (w/v) to about 99% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the fracturing fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the fracturing fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a fracturing fluid having a sufficient concentration of an aqueous base fluid for a given application.

In some optional examples, the fracturing fluids comprise a proppant. The proppant may be any material used to prop the fracture preventing its closure. Examples of proppant include, but are not limited to, sand including high-quality and low-quality sand, particulate garnet, metal particulates, ceramic proppants, aluminum oxide, bauxite, bauxitic clay, kaolin, alumino-silicates, iron oxide and other ores or minerals, cement, cement composites, ceramics, polymer composites containing particulate materials, such as nanoparticles, porous ceramics, porous organic materials, porous metals, low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof. The proppant may be any shape (e.g., the proppant may be substantially or partially spherical in shape, substantially or partially round in shape, cylindrical, fibrous, polygonal shaped (such as cubic), irregularly shaped, etc.). The proppant may be any size. One of ordinary skill in the art, with the benefit of this disclosure, should be readily able to select a proppant for a chosen application.

In some optional examples, the fracturing fluids may further comprise an additive. The additive may be used to adjust a property of the fracturing fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

The present disclosure provides fracturing fluids, methods, and systems for treating a subterranean formation. The fracturing fluids comprise a water-soluble terpolymer, an aqueous base fluid, an anti-syneresis agent, a hydration aid, an antioxidizing agent, a metal crosslinking agent, and a breaker. In some optional examples, the fracturing fluid may also comprise a proppant. The methods may include preparing a fracturing fluid comprising the anti-syneresis agent. The methods may include pumping the fracturing fluid in a wellbore penetrating a subterranean formation. The methods may also include introducing the fracturing fluid into a portion of the subterranean formation from the wellbore. The systems may include pumping and mixing equipment to convey the fracturing fluid to the interval of the wellbore comprising the target subterranean formation.

Example systems may comprise a pump fluidly coupled to a tubular, the tubular containing a fracturing fluid as described herein. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the fracturing fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps may include, but are not limited to, floating piston pumps and positive displacement pumps. In other examples, the pump may be a low-pressure pump. As used herein, the term "low-pressure pump" will refer to a pump that operates at a pressure of less than about 1000 psi, for example a pressure of 100 psi. In some examples, a low-pressure pump may be fluidly coupled to a high-pressure pump that is fluidly coupled to the tubular. That is, the low-pressure pump may be configured to convey the fracturing fluid to the high-pressure pump. In such examples, the low-pressure pump may "step up" the pressure of the fracturing fluid before it reaches the high-pressure pump. In any example, a high-pressure pump and/or a low-pressure pump may convey the fracturing fluid to the location of a target subterranean formation. The pumps may supply sufficient pressure to allow the fracturing fluid to fracture the subterranean formation. That is, the pumps may meet or exceed the fracture gradient of the subterranean formation.

In some examples, the systems described herein may further comprise a mixing tank that is upstream of the pump and is the vessel in which the fracturing fluid is formulated. In various examples, the pump (e.g., a low-pressure pump, a high-pressure pump, or a combination thereof) may convey the fracturing fluid from the mixing tank to the transporting conduit. In other examples, the fracturing fluid may be formulated offsite and transported to a worksite, in which case the fracturing fluid may be introduced to the transporting conduit via the pump either directly from its shipping container (e.g., a truck, a railcar, a barge, or the like) or from a transport pipeline. In either case, the fracturing fluid may be drawn into the pump, elevated to an appropriate pressure, and then introduced into the transporting conduit for delivery downhole.

When desired for use, the components of the fracturing fluid may be combined to prepare the fracturing fluid as desired. In some examples, the water-soluble terpolymer may be hydrated before it is introduced to the aqueous base fluid. The components and additives of the fracturing fluid may be added or introduced to one another in any order and at any time during the use of the fracturing fluid. In some examples, the anti-syneresis agent may be added on-the-fly as the base fluid and one or more of the other components are introduced to the wellbore.

FIG. 1 illustrates a schematic of the surface and near-surface portions of a system that can deliver the fracturing fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a fracturing fluid comprising the anti-syneresis agent may be formulated. The fracturing fluid may be conveyed via line 110 to wellhead 115, where the fracturing fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the fracturing fluid may subsequently enter into subterranean formation 130 as described in FIG. 2 below. Pump 140 may be configured to raise the pressure of the fracturing fluid to a desired degree before its introduction into tubular 120.

Although not depicted in FIG. 1, the fracturing fluid may, in some examples, flow back to wellhead 115 and exit subterranean formation 130. In some optional examples, the fracturing fluid that has flowed back to wellhead 115 may subsequently be recovered and recirculated to subterranean formation 130.

Figure 2:
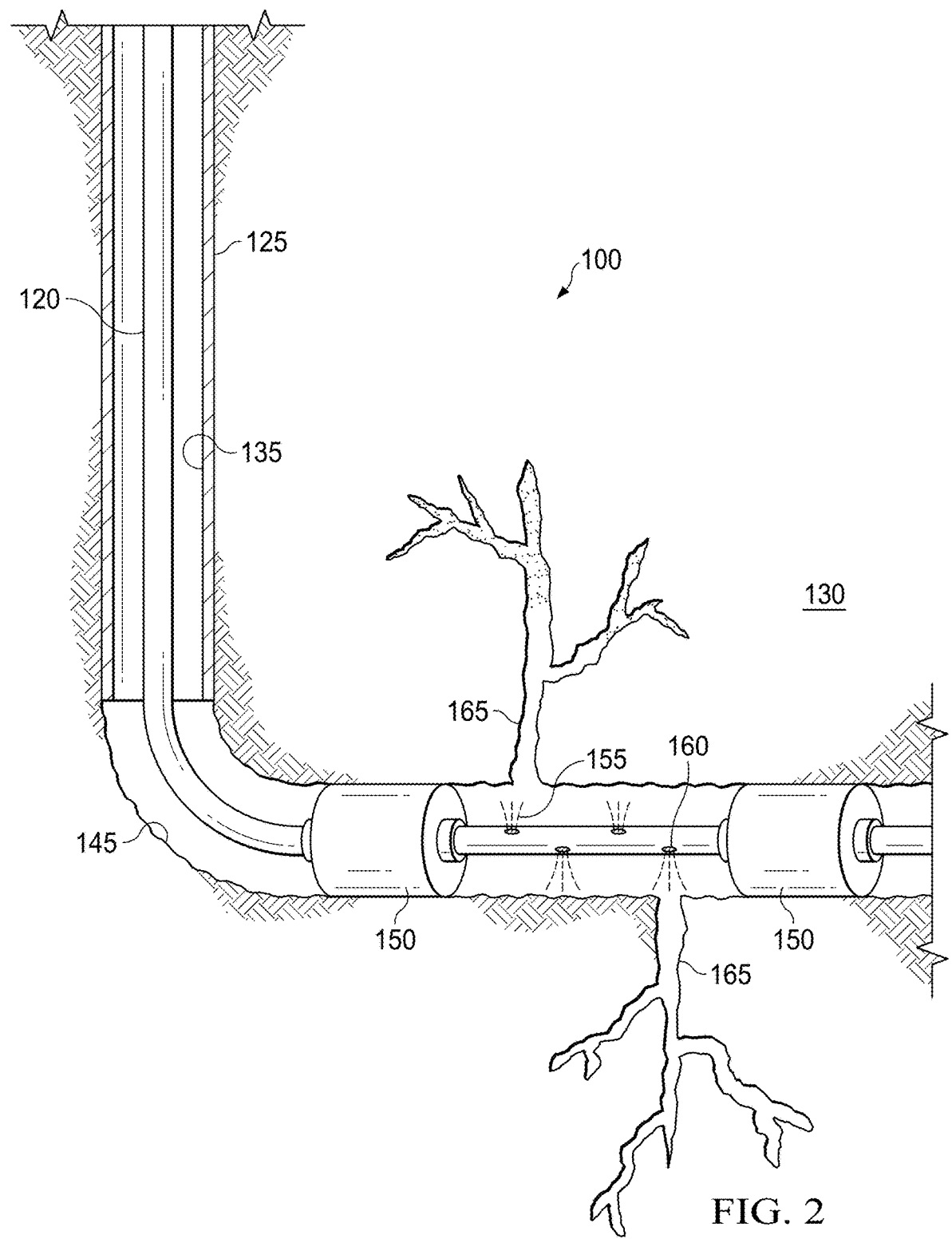
FIG. 2 is a schematic illustrating the placement of a fracturing fluid into a fracture in a subterranean formation in accordance with one or more examples described herein.

FIG. 2 illustrates a schematic of the downhole portion of the system 100 illustrated in FIG. 1, according to one or more examples. As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A fracturing fluid 155, as described herein, may exit tubular 120 through openings 160. The fracturing fluid 155 may be introduced into the subterranean formation 130 via a primary fracture 165 of other such opening into the subterranean formation 130. The fracturing fluid 155 may create or enhance the primary fracture 165.

In some examples, the wellbore penetrating the subterranean formation comprises a temperature greater than 300° F. and may have a temperature up to about 475° F. In some examples, the shear rate at which the fracturing fluid is introduced into the wellbore may be about 25 $s^{-1}$ up to about 17,000 $s^{-1}$, and/or have a pump rate of about 0.5 to about 330 bbls/min.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

To facilitate a better understanding of the present embodiments, the following examples of certain aspects of some embodiments are given. In no way should the following examples be read to limit, or define, the entire scope of the embodiments.

EXAMPLES

Figure 3:
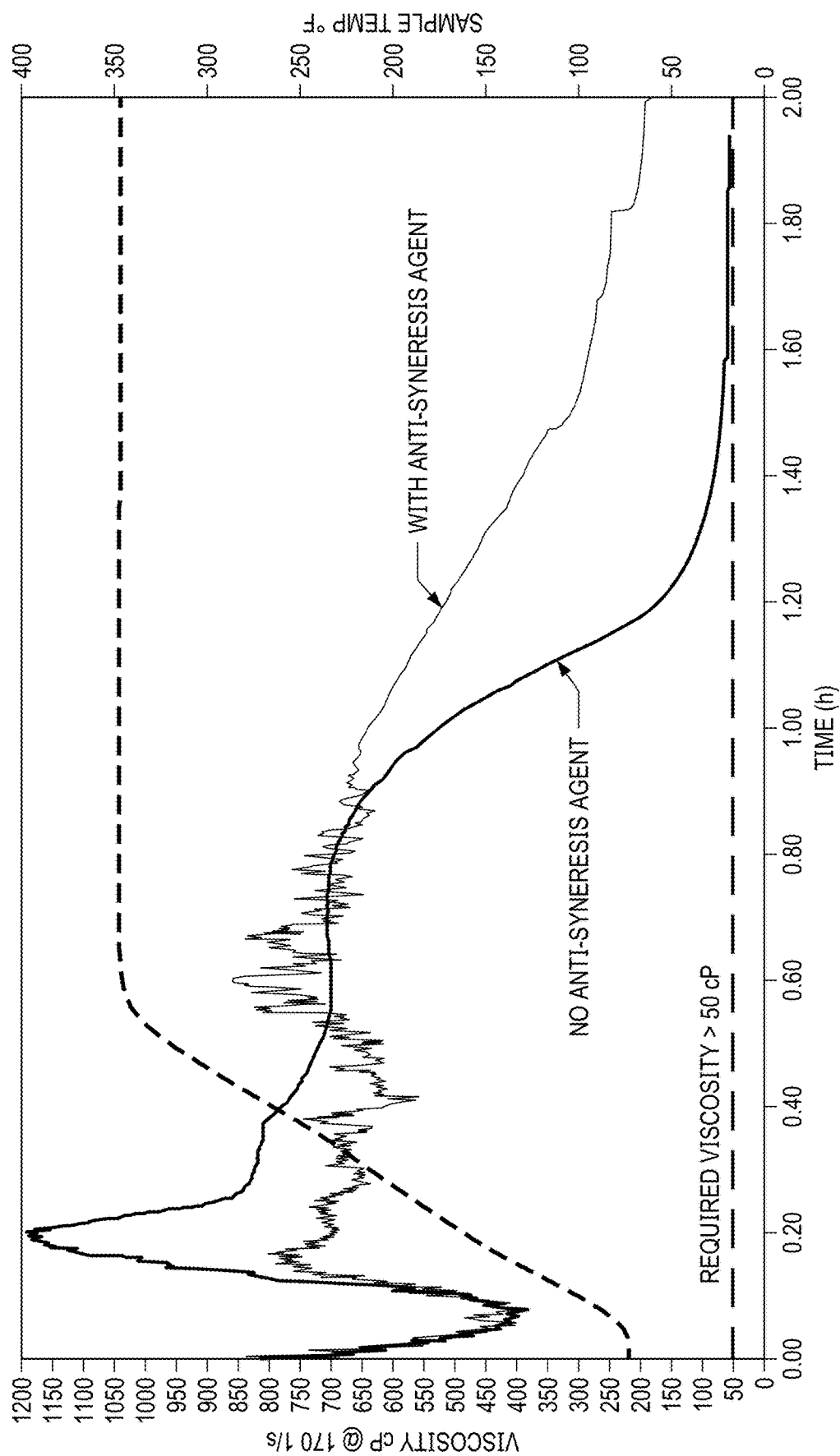
FIG. 3 is a graph illustrating an experiment comparing two fracturing fluids, one with an anti-syneresis agent and one without an anti-syneresis agent, in accordance with one or more examples described herein.

An experiment was conducted to compare the effect of a fracturing fluid with and without an anti-syneresis agent. Two near identical fracturing fluids utilizing a base fluid of seawater were compared. The difference between the two experimental fluids being that one of the fluids contains an anti-syneresis agent and the other does not. A rheometer was used to take viscosity readings as the treatment temperature was increased to 350° F. over a time of two hours and at a shear rate of 170 $s^{-1}$. The results are shown in FIG. 3. The results indicate that the sample without the anti-syneresis agent begins to lose viscosity faster than the sample with the anti-syneresis agent and ultimately falls below the 50 cP threshold by the two hour mark.

Figure 4:
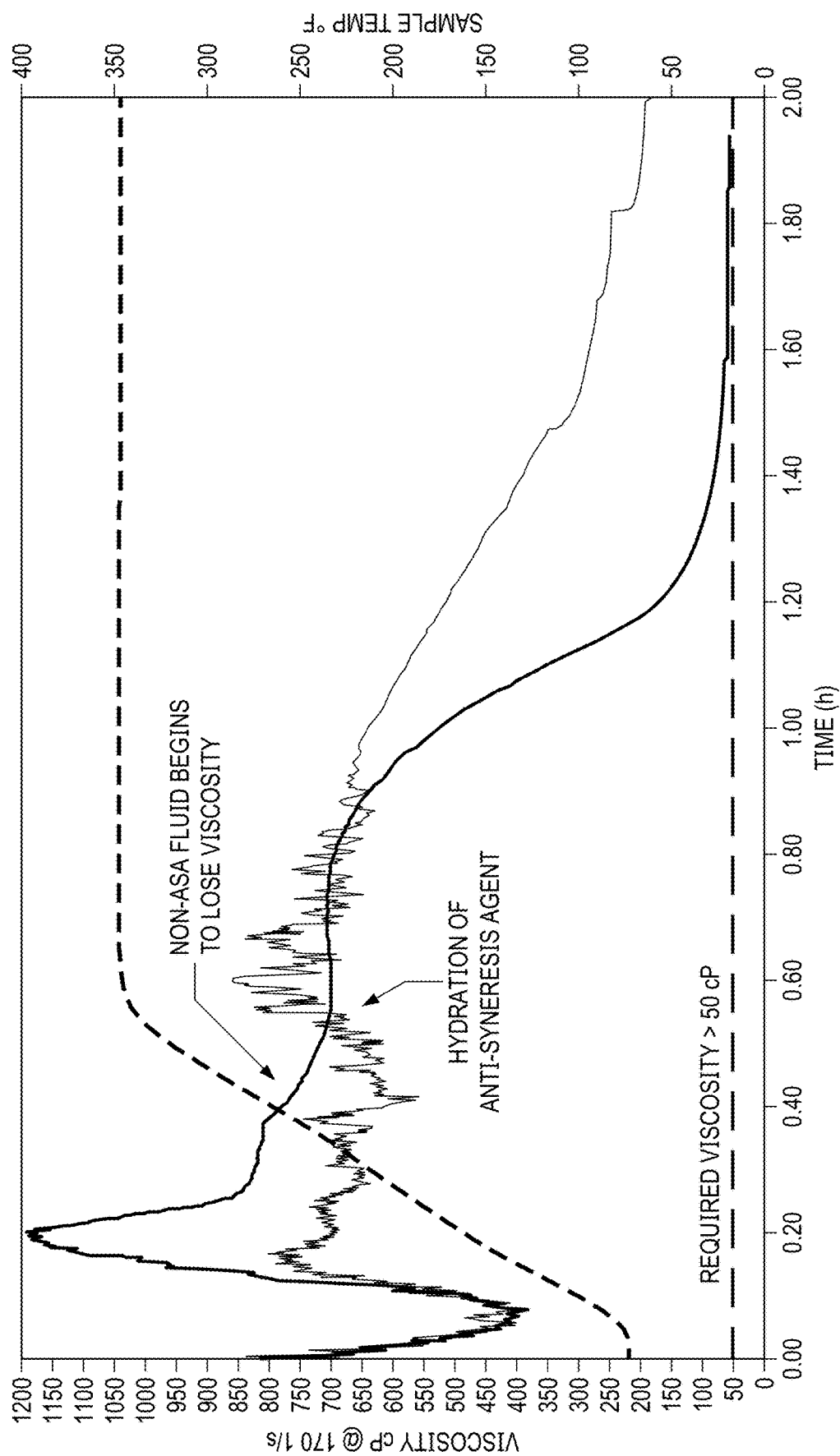
FIG. 4 is the same graph as presented by FIG. 3, except this graph has been annotated to show the approximate start of syneresis of the water-soluble terpolymer and the corresponding beginning of hydration of the anti-syneresis agent in accordance with one or more examples described herein.

FIG. 4 illustrates the same graph as presented by FIG. 3 but is annotated to reference the start of syneresis of the terpolymer and a corresponding hydration by the anti-syneresis agent. The sample without the anti-syneresis agent begins to see a loss of viscosity around 275° F. It is believed that this viscosity loss is due to the metal crosslinked terpolymer excreting water in the base brine resulting in a loss of fluid stability. The sample with the anti-syneresis agent shows a slower loss of viscosity over the same time interval and increasing temperature. This is believed to be due to the hydration of the anti-syneresis agent.

Figure 5:
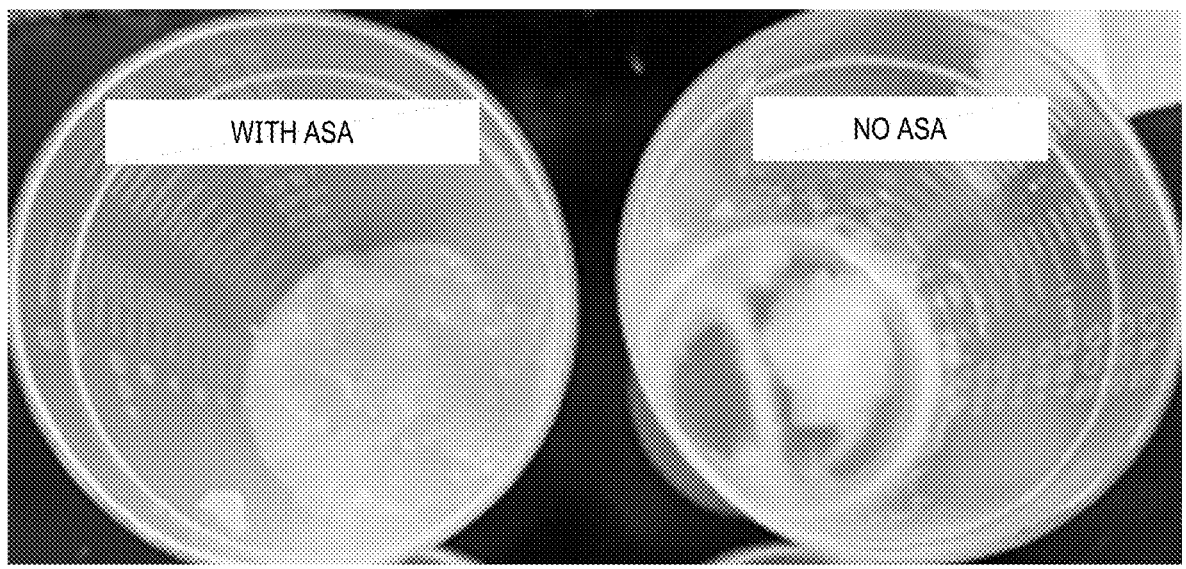
FIG. 5 is a photograph of the two fracturing fluids from the experiment of FIGS. 3 and 4 in accordance with one or more examples described herein.

FIG. 5 is a photograph of the two fluid samples after measurement by the rheometer. Post experiment, a visual inspection of the fracturing fluid was made. The inspection showed that the sample with the anti-syneresis agent was more robust after the experiment than the fracturing fluid that did not contain the anti-syneresis agent.

The fracturing fluids disclosed herein may directly or indirectly affect one or more components or pieces of equipment associated with or which may come into contact with the fracturing fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are fracturing fluids for treating a subterranean formation in accordance with the disclosure and the illustrated FIGS. An example fracturing fluid comprises an anti-syneresis agent, a water-soluble terpolymer, a terpolymer hydration aid, an antioxidizing agent, a metal crosslinking agent, a breaker, and an aqueous base fluid.

Additionally or alternatively, the fracturing fluids may include one or more of the following features individually or in combination. The anti-syneresis agent may be a crosslinked copolymer comprising two crosslinkers. The anti-syneresis agent may comprise comonomers selected from the group consisting of acrylamide, N-vinylpyrrolidone, 2-acrylamidobutanesulfonic acid ammonium salt, and any combinations thereof. The two crosslinkers for the anti-syneresis agent may be selected from the group consisting of N,N'-methylenebisacrylamide, tri(ethylglycol)divinyl ether, triallyl isocyanurate, pentaerythritol allyl ether, and any combinations thereof. The anti-syneresis agent may be a powder dispersed in the fracturing fluid. The anti-syneresis agent may be present in the fracturing fluid at a concentration in a range of about 0.05% w/w to about 20% w/w. The water-soluble terpolymer may be formed from three monomers selected from the group consisting of neutral acrylamide-based monomers, charged acrylamide-based monomers, diallyl-based monomers, vinyl-sulfonate based monomers, neutral acrylic acid-based monomers, charged acrylic-acid based monomers, vinyl-phosphonic acid-based monomers, and any combinations thereof. The terpolymer may be present in the fracturing fluid at a concentration in a range of about 0.05% w/w to about 20% w/w. The aqueous base fluid may be seawater. The aqueous base fluid may comprise a total dissolved solids concentration of about 15,000 ppm to about 500,000 ppm. The fracturing fluid may further comprise a proppant.

Provided are methods for treating a subterranean formation with a fracturing fluid in accordance with the disclosure and the illustrated FIGS. An example method comprises preparing a fracturing fluid by combining an anti-syneresis agent, a water-soluble terpolymer, a terpolymer hydration aid, an antioxidizing agent, a metal crosslinking agent, a breaker, and an aqueous base fluid. The method further comprises introducing the fracturing fluid into a wellbore penetrating the subterranean formation at a pressure sufficient to fracture the subterranean formation and fracturing the subterranean formation with the fracturing fluid.

Additionally or alternatively, the method may include one or more of the following features individually or in combination. The wellbore may comprise a temperature of 300° F. or greater. The introducing the fracturing fluid into a wellbore may comprise introducing the fracturing fluid into a wellbore at a shear rate of about 25 $s^{-1}$ up to about 17,000 $s^{-1}$ and/or a pump rate of about 0.5 to about 330 bbls/min. The fracturing fluid may further comprise a proppant and the method may further comprise depositing the proppant in the fracture. The anti-syneresis agent may be a crosslinked copolymer comprising two crosslinkers. The anti-syneresis agent may comprise comonomers selected from the group consisting of acrylamide, N-vinylpyrrolidone, 2-acrylamidobutanesulfonic acid ammonium salt, and any combinations theeof. The two crosslinkers for the anti-syneresis agent may be selected from the group consisting of N,N'-methylenebisacrylamide, tri(ethylglycol)divinyl ether, triallyl isocyanurate, pentaerythritol allyl ether, and any combinations thereof. The anti-syneresis agent may be a powder dispersed in the fracturing fluid. The anti-syneresis agent may be present in the fracturing fluid at a concentration in a range of about 0.05% w/w to about 20% w/w. The water-soluble terpolymer may be formed from three monomers selected from the group consisting of neutral acrylamide-based monomers, charged acrylamide-based monomers, diallyl-based monomers, vinyl-sulfonate based monomers, neutral acrylic acid-based monomers, charged acrylic-acid based monomers, vinyl-phosphonic acid-based monomers, and any combinations thereof. The terpolymer may be present in the fracturing fluid at a concentration in a range of about 0.05% w/w to about 20% w/w. The aqueous base fluid may be seawater. The aqueous base fluid may comprise a total dissolved solids concentration of about 15,000 ppm to about 500,000 ppm. The fracturing fluid may further comprise a proppant.

Provided are systems for treating a subterranean formation with a fracturing fluid in accordance with the disclosure and the illustrated FIGS. An example system comprises a fracturing fluid comprising: an anti-syneresis agent, a water-soluble terpolymer, a terpolymer hydration aid, an antioxidizing agent, a metal crosslinking agent, a breaker, and an aqueous base fluid. The system further comprises mixing equipment configured to mix the anti-syneresis agent, the water-soluble terpolymer, the terpolymer hydration aid, the antioxidizing agent, the metal crosslinking agent, the breaker, and the aqueous base fluid; and pumping equipment configured to pump the fracturing fluid in the wellbore.

Additionally or alternatively, the system may include one or more of the following features individually or in combination. The anti-syneresis agent may be a crosslinked copolymer comprising two crosslinkers. The anti-syneresis agent may comprise comonomers selected from the group consisting of acrylamide, N-vinylpyrrolidone, 2-acrylamidobutanesulfonic acid ammonium salt, and any combinations theeof. The two crosslinkers for the anti-syneresis agent may be selected from the group consisting of N,N'-methylenebisacrylamide, tri(ethylglycol)divinyl ether, triallyl isocyanurate, pentaerythritol allyl ether, and any combinations thereof. The anti-syneresis agent may be a powder dispersed in the fracturing fluid. The anti-syneresis agent may be present in the fracturing fluid at a concentration in a range of about 0.05% w/w to about 20% w/w. The water-soluble terpolymer may be formed from three monomers selected from the group consisting of neutral acrylamide-based monomers, charged acrylamide-based monomers, diallyl-based monomers, vinyl-sulfonate based monomers, neutral acrylic acid-based monomers, charged acrylic-acid based monomers, vinyl-phosphonic acid-based monomers, and any combinations thereof. The terpolymer may be present in the fracturing fluid at a concentration in a range of about 0.05% w/w to about 20% w/w. The aqueous base fluid may be seawater. The aqueous base fluid may comprise a total dissolved solids concentration of about 15,000 ppm to about 500,000 ppm. The fracturing fluid may further comprise a proppant.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A fracturing fluid for treating a subterranean formation, the fracturing fluid comprises:
    an anti-syneresis agent comprising a crosslinked copolymer comprising two crosslinkers,
    a water-soluble terpolymer,
    a terpolymer hydration aid selected from the group consisting of alkylphenol alkoxylate, alkyl polyglucosides, alkoxylated alkylamines, alkoxylated primary alcohols, alkoxylated branched alcohols, and any combination thereof,
    an antioxidizing agent selected from the group consisting of sodium thiosulfate, ascorbic acid, phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide, 3-phenylphenothiazine, N-phenylphenothiazine, 10,10'-diphenyl-phenothiazine, N-benzoylphenothiazine, 7-benzoylphenothiazine, 3,7-difluorophenothiazine, N-ethylphenothiazine, 2-acetyl-phenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-octadecylphenothiazine, N-propylphenothiazine, any hydrochlorides thereof, and any combination thereof,
    a metal crosslinking agent comprising a multivalent metal ion or metal complex selected from zirconium, aluminum, titanium, boron, chromium, iron, water-soluble salts of the multivalent metal ions, halides, complexes of the multivalent metal ions with organic N- and O-compounds, alcohols, mono-, di- and tri-carboxylic acids, mono-, di- and triamines, hydroxyalkylamines, or any combination of multivalent metal ion and/or metal complex,
    a breaker selected from the group consisting of a persulfate, perborate, percarbonate, peroxide, bromate, chlorite, N- and O-acyl compound, dialkyperoxide, diacylperoxide, peroxydicarbonate, alkylhydroperoxide, ester of peracid, and any combination thereof, and
    an aqueous base fluid.

2. The fracturing fluid of claim 1, wherein the anti-syneresis agent comprises comonomers selected from the group consisting of acrylamide, N-vinylpyrrolidone, 2-acrylamidobutanesulfonic acid ammonium salt, and any combinations theeof.

3. The fracturing fluid of claim 1, wherein the two crosslinkers for the anti-syneresis agent are selected from the group consisting of N,N'-methylenebisacrylamide, tri(ethylglycol)divinyl ether, triallyl isocyanurate, pentaerythritol allyl ether, and any combinations thereof.

4. The fracturing fluid of claim 1, wherein the anti-syneresis agent is a powder dispersed in the fracturing fluid.

5. The fracturing fluid of claim 1, wherein the anti-syneresis agent is present in the fracturing fluid at a concentration in a range of about 0.05% w/w to about 20% w/w.

6. The fracturing fluid of claim 1, wherein the water-soluble terpolymer is formed from three monomers selected from the group consisting of neutral acrylamide-based monomers, charged acrylamide-based monomers, diallyl-based monomers, vinyl-sulfonate based monomers, neutral acrylic acid-based monomers, charged acrylic-acid based monomers, vinyl-phosphonic acid-based monomers, and any combinations thereof.

7. The fracturing fluid of claim 1, wherein the terpolymer is present in the fracturing fluid at a concentration in a range of about 0.05% w/w to about 20% w/w.

8. The fracturing fluid of claim 1, wherein the aqueous base fluid is seawater.

9. The fracturing fluid of claim 1, wherein the aqueous base fluid comprises a total dissolved solids concentration of about 15,000 ppm to about 500,000 ppm.

10. The fracturing fluid of claim 1, wherein the fracturing fluid further comprises a proppant.

11. A method for treating a subterranean formation using a fracturing fluid, the method comprises:
preparing a fracturing fluid by combining an anti-syneresis agent, a water-soluble terpolymer, a terpolymer hydration aid, an antioxidizing agent, a metal crosslinking agent, a breaker, and an aqueous base fluid;
wherein the anti-syneresis agent comprises a crosslinked copolymer comprising two crosslinkers;
wherein the terpolymer hydration aid is selected from the group consisting of alkylphenol alkoxylate, alkyl polyglucosides, alkoxylated alkylamines, alkoxylated primary alcohols, alkoxylated branched alcohols, and any combination thereof;
wherein the antioxidizing agent is selected from the group consisting of sodium thiosulfate, ascorbic acid, phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide, 3-phenylphenothiazine, N-phenylphenothiazine, 10,10'-diphenylphenothiazine, N-benzoylphenothiazine, 7-benzoylphenothiazine, 3,7-difluorophenothiazine, N-ethylphenothiazine, 2-acetyl-phenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-octadecylphenothiazine, N-propylphenothiazine, any hydrochlorides thereof, and any combination thereof;

wherein the metal crosslinking agent comprises a multivalent metal ion or metal complex selected from zirconium, aluminum, titanium, boron, chromium, iron, water-soluble salts of the multivalent metal ions, halides, complexes of the multivalent metal ions with organic N- and O-compounds, alcohols, mono-, di- and tri-carboxylic acids, mono-, di- and triamines, hydroxyalkylamines, or any combination of multivalent metal ion and/or metal complex,
wherein the breaker is selected from the group consisting of a persulfate, perborate, percarbonate, peroxide, bromate, chlorite, N- and O-acyl compound, dialkyperoxide, diacylperoxide, peroxydicarbonate, alkylhydroperoxide, ester of peracid, and any combination thereof;
introducing the fracturing fluid into a wellbore penetrating the subterranean formation at a pressure sufficient to fracture the subterranean formation, and
fracturing the subterranean formation with the fracturing fluid.

12. The method of claim 11, wherein the wellbore comprises a temperature of 300° F. or greater.

13. The method of claim 11, wherein the introducing the fracturing fluid into a wellbore comprises introducing the fracturing fluid into a wellbore at a shear rate of about 25 s$^{-1}$ up to about 17,000 s$^{-1}$, and/or a pump rate of about 0.5 to about 330 bbls/min.

14. The method of claim 11, wherein the fracturing fluid further comprises a proppant and the method further comprises depositing the proppant in the fracture.

15. The method of claim 11, wherein the anti-syneresis agent comprises comonomers selected from the group consisting of acrylamide, N-vinylpyrrolidone, 2-acrylamidobutanesulfonic acid ammonium salt, and any combinations theeof.

16. The method of claim 11, wherein the two crosslinkers for the anti-syneresis agent are selected from the group consisting of N,N'-methylenebisacrylamide, tri (ethylglycol) divinyl ether, triallyl isocyanurate, pentaerythritol allyl ether, and any combinations thereof.

17. The method of claim 11, wherein the anti-syneresis agent is a powder dispersed in the fracturing fluid.

18. A system for treating a subterranean formation using a fracturing fluid, the system comprises:
a fracturing fluid comprising:
an anti-syneresis agent comprising a crosslinked copolymer comprising two crosslinkers,
a water-soluble terpolymer,
a terpolymer hydration aid selected from the group consisting of alkylphenol alkoxylate, alkyl polyglucosides, alkoxylated alkylamines, alkoxylated primary alcohols, alkoxylated branched alcohols, and any combination thereof,
an antioxidizing agent selected from the group consisting of sodium thiosulfate, ascorbic acid, phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide, 3-phenylphenothiazine, N-phenylphenothiazine, 10,10'-diphenylphenothiazine, N-benzoylphenothiazine, 7-benzoylphenothiazine, 3,7-difluorophenothiazine, N-ethylphenothiazine, 2-acetyl-phenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-octadecylphenothiazine, N-propylphenothiazine, any hydrochlorides thereof, and any combination thereof, a metal crosslinking agent comprising a multivalent metal ion or metal complex selected from zirconium, aluminum, titanium, boron, chromium, iron, water-soluble salts of the multivalent metal ions, halides, complexes of the multivalent metal ions with organic N- and O-compounds, alcohols, mono-, di- and tri-carboxylic acids, mono-, di- and triamines, hydroxyalkylamines, or any combination of multivalent metal ion and/or metal complex, a breaker selected from the group consisting of a persulfate, perborate, percarbonate, peroxide, bromate, chlorite, N- and O-acyl compound, dialkyperoxide, diacylperoxide, peroxydicarbonate, alkylhydroperoxide, ester of peracid, and any combination thereof, and an aqueous base fluid;

mixing equipment configured to mix the anti-syneresis agent, the water-soluble terpolymer, the terpolymer hydration aid, the antioxidizing agent, the metal crosslinking agent, the breaker, and the aqueous base fluid; and pumping equipment configured to pump the fracturing fluid in the wellbore.

19. The system of claim 18, wherein the anti-syneresis agent is a powder dispersed in the fracturing fluid.

20. The system of claim 18, wherein the fracturing fluid further comprises proppant.

* * * * *

UNITED STATES PATENT AND TRADEMARK OFFICE
CERTIFICATE OF CORRECTION

| | | |
|---|---|---|
| PATENT NO. | : 12,247,165 B2 | Page 1 of 1 |
| APPLICATION NO. | : 18/233215 | |
| DATED | : March 11, 2025 | |
| INVENTOR(S) | : Antonio Recio, Linping Ke and William Cecil Pearl | |

It is certified that error appears in the above-identified patent and that said Letters Patent is hereby corrected as shown below:

In the Claims

In Claim 2, Column 21, Line 3, replace "theeof" with --thereof--.

In Claim 12, Column 22, Line 22, replace "F." with --F--.

In Claim 15, Column 22, Line 35, replace "theeof" with --thereof--.

Signed and Sealed this
First Day of July, 2025

Coke Morgan Stewart
*Acting Director of the United States Patent and Trademark Office*